(12) United States Patent
Konno

(10) Patent No.: US 7,720,373 B2
(45) Date of Patent: May 18, 2010

(54) IMAGE PICKUP APPARATUS HAVING, DISPOSED BETWEEN AN IMAGE PICKUP OPTICAL SYSTEM AND AN IMAGE PICKUP UNIT, A BIREFRINGENT CRYSTAL OPTICAL MEMBER, A PHASE-DIFFERENCE-CHANGING CRYSTAL OPTICAL MEMBER, AND A BIREFRINGENT ORGANIC FILM

(75) Inventor: Tatsuo Konno, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 710 days.

(21) Appl. No.: 11/412,359

(22) Filed: Apr. 26, 2006

(65) Prior Publication Data

US 2006/0256228 A1    Nov. 16, 2006

(30) Foreign Application Priority Data

May 12, 2005    (JP)    ............................. 2005-139897

(51) Int. Cl.
*G03B 7/099*    (2006.01)
*H04N 5/225*    (2006.01)

(52) U.S. Cl. ................... 396/268; 348/342; 396/661

(58) Field of Classification Search .............. 396/268, 396/661; 348/290, 335, 342, 340; 359/494, 359/495, 497, 498, 499, 352
See application file for complete search history.

(56) References Cited

U.S. PATENT DOCUMENTS

| 5,820,779 | A | 10/1998 | Shouji et al. | |
| 6,529,326 | B2* | 3/2003 | Cai | 359/498 |
| 6,980,250 | B1 | 12/2005 | Kayanuma et al. | |
| 7,075,719 | B2* | 7/2006 | Osawa | 359/495 |
| 2003/0107829 | A1* | 6/2003 | Kouno | 359/892 |

FOREIGN PATENT DOCUMENTS

| JP | 6-317765 A | 11/1994 |
| JP | 8-122708 A | 5/1996 |
| JP | 2000-114502 A | 4/2000 |

\* cited by examiner

*Primary Examiner*—Christopher Mahoney
(74) *Attorney, Agent, or Firm*—Canon U.S.A., Inc. I.P. Division

(57) ABSTRACT

At least one exemplary embodiment is directed to an image pickup apparatus which includes an image pickup unit, a first optical member, a film, a second optical member, and a luminosity correcting filter. The image pickup unit includes an image sensor. The first optical member is operatively attached to the image pickup unit and formed of a birefringent crystal material. The film is disposed between the first optical member and an image pickup optical system and formed of an organic material. The second optical member is operatively attached to a first side of the film. The luminosity correcting filter is operatively attached to a second side of the film.

1 Claim, 3 Drawing Sheets

IMAGE PICKUP APPARATUS HAVING, DISPOSED BETWEEN AN IMAGE PICKUP OPTICAL SYSTEM AND AN IMAGE PICKUP UNIT, A BIREFRINGENT CRYSTAL OPTICAL MEMBER, A PHASE-DIFFERENCE-CHANGING CRYSTAL OPTICAL MEMBER, AND A BIREFRINGENT ORGANIC FILM

BACKGROUND OF THE INVENTION

1. Field of the Invention

The present invention relates to an image pickup apparatus having an optical member between an image pickup optical system and an image sensor.

2. Description of the Related Art

FIG. 1 schematically shows the internal structure of a digital single lens reflex camera as an example of a conventional image pickup apparatus.

In FIG. 1, the digital single lens reflex camera (hereinafter referred to as "DSLR") includes a replaceable photographing lens 1, a reflecting mirror 2, a focal-plane shutter 3, an optical filter 4, an image pickup unit 5, and a finder optical system 6. The reflecting mirror 2 can swing so as to move out of the optical path of the photographing optical system during photographing. The focal-plane shutter 3 mechanically controls the exposure time. The optical filter 4 includes an optical low-pass filter (to be hereinafter described) and a luminosity correcting filter attached to each other. The image pickup unit 5 is disposed at a predetermined focal point of the photographing lens 1 and includes a solid-state image sensor (e.g., a CCD (Charge-Coupled Device) or a CMOS (Complementary MOS)). The finder optical system 6 is disposed above the reflecting mirror 2. After passing through the photographing lens 1, light is led to the finder optical system 6 by the reflecting mirror 2.

The reflecting mirror 2 is located in the optical path of the photographing optical system. When photographing is started by pressing down a release switch (not shown), the reflecting mirror 2 moves out of the optical path of the photographing optical system.

When the reflecting mirror 2 is located in the optical path of the photographing optical system, a subject image formed by the photographing lens 1 can be observed as a finder image through the finder optical system 6. When the reflecting mirror 2 is out of the optical path of the photographing optical system, by releasing the focal-plane shutter 3, the subject image is formed on an image pickup surface of the image pickup unit 5 through the optical filter 4. The image pickup unit 5 outputs an image pickup signal, which is stored in a memory (not shown).

When a subject has high-frequency components, a solid-state image sensor (e.g., a CCD or a CMOS) can generate false signals depending on its sampling frequency. An optical low-pass filter (hereinafter referred to as "optical LPF") can be used for reducing such false signals.

Such an optical LPF includes a combination of one or more quartz birefringence plates and one or more quartz phase plates. In general, a first quartz birefringence plate, a quartz phase plate, and a second quartz birefringence plate can be arranged in this order.

The optical axis of the first quartz birefringence plate is tilted at a predetermined angel, typically at an angle of 45 degrees, with respect to a normal to the entrance plane of the plate. The first quartz birefringence plate is disposed such that the orthogonal projection of its optical axis onto the entrance plane of the plate is in the horizontal direction of the image sensor so as to lower the spatial frequency response. In addition, the first quartz birefringence plate has functions of separating incident light into linearly polarized ordinary and extraordinary rays having predetermined planes of vibration, and of moving the extraordinary ray in the horizontal direction of the image sensor by a predetermined distance.

The optical axis of the quartz phase plate is perpendicular to a normal to the entrance plane of the plate, that is to say, in the plane of the plate. The quartz phase plate is disposed such that its optical axis is at an angle of 45 degrees with respect to the orthogonal projection of the optical axis of the first quartz birefringence plate onto the entrance plane of the plate, that is to say, at an angle of 45 degrees with respect to the horizontal direction. In addition, the quartz phase plate has a function of changing the phases of the linearly polarized ordinary and extraordinary rays having predetermined planes of vibration output from the first quartz birefringence plate. The quartz phase plate changes the phases of the incident rays by a phase difference determined by the thickness of the quartz phase plate and the wavelength of the incident rays.

The optical axis of the second quartz birefringence plate is tilted at a predetermined angel, typically at an angle of 45 degrees, with respect to a normal to the entrance plane of the plate. The second quartz birefringence plate is disposed such that the orthogonal projection of its optical axis onto the entrance plane of the plate is in the vertical direction of the image sensor so as to lower the spatial frequency response. In addition, the second quartz birefringence plate has functions of separating incident light into linearly polarized ordinary and extraordinary rays having predetermined planes of vibration, and of moving the extraordinary ray in the vertical direction of the image sensor by a predetermined distance.

In the above-described example, by combining and arranging the first quartz birefringence plate, the quartz phase plate, and the second quartz birefringence plate with the directions of their optical axes appropriately set, the subject image is separated in the horizontal and vertical directions of the image sensor into four images in total, thereby lowering the spatial frequency response in the horizontal and vertical directions of the image sensor corresponding to the separation distance.

However, if a replaceable lens designed for a silver salt film camera is used as a photographing lens for a DSLR such as one shown in FIG. 1, the following difficulties can arise. First, a significant change in the ray aberration of the photographing lens 1 can occur due to the interaction of the ray with the optical filter 4, disposed between the photographing lens 1 and the image pickup surface, and a cover glass, attached to the image pickup unit 5 for protecting the image sensor. In addition, the space between the focal-plane shutter 3 and the image pickup surface for disposing the optical filter 4 will be very small.

To alleviate the above difficulties, the following proposals have been made.

A first conventional technology uses a plate of lithium niobate. The separation distance between ordinary and extraordinary rays is determined by (1) the ordinary and extraordinary refractive indices of a single crystal material, (2) the angle between a normal to the entrance plane of a single crystal plate and its crystal axis, and (3) the thickness of the plate. On the premise that (2) the angle between a normal to the entrance plane of a single crystal plate and its crystal axis is efficiently set, the separation distance between ordinary and extraordinary rays is determined generally by (1) the ordinary and extraordinary refractive indices of a single crystal material. The difference between ordinary and extraordinary refractive indices of lithium niobate is bigger than that of quartz. Therefore, when the separation distance between ordinary and extraordinary rays is the same, an optical LPF using a lithium niobate plate can be thinner than an optical LPF using a quartz plate.

A second conventional technology uses a liquid crystal optical filter such that the liquid crystal is injected between two substrates opposite to each other (for example, Japanese Patent Laid-Open No. 6-317765). By providing the liquid crystal molecules with a particular alignment, the filter has a large birefringent anisotropy. Therefore, reduction in the size, thickness, and cost of an optical LPF, which is not expected in an optical LPF using a quartz plate, can be achieved.

A third conventional technology uses a polymeric optical LPF (for example, Japanese Patent Laid-Open No. 8-122708). A particular photo-polymerizable liquid crystal composition is photo-polymerized, and the obtained optically anisotropic polymeric film is used as an optical LPF. Compared to quartz, a very large anisotropy of refractive index can be obtained. Therefore, reduction in the size, thickness, and weight of an optical LPF can be achieved.

A fourth conventional technology uses an optical LPF formed of a birefringent material as a cover for protecting an image sensor (for example, Japanese Patent Laid-Open No. 2000-114502). Since a conventional cover glass can be omitted, the thickness of the whole optical plate can be reduced by the thickness of the conventional cover glass.

However, the first to fourth conventional technologies can have the following difficulties.

In the first conventional technology, by forming an optical LPF of a single crystal material of lithium niobate, the whole optical LPF can be thin. However, it can be difficult to polish the plate due to the hardness of the material itself. In addition, since the material has a high refractive index, a high level of antireflective process can be necessary, and therefore the cost increases.

In the second and third conventional technologies, attention is focused on properties of a certain kind of organic material used for liquid crystal and so on, such that the alignment direction of molecules of the organic material is changed by applying an electric field or a magnetic field. Characteristics such that when the alignment direction is uniform, the organic material exhibits an anisotropy related to that of single crystal materials, are applied to an optical LPF. However, it can be difficult to make the alignment direction uniform. Whatever methods are used, alignment nonuniformity remains, and consequently light scattering occurs. A drawback of light scattering is, for example, the fact that, in the case of a point light source, a blur halo can be generated around it to deteriorate the image quality. If liquid crystal layers are layered in the second conventional technology, or if optically anisotropic polymeric films are layered in the third conventional technology, this light scattering is increased approximately in proportion to the number of the layers.

In the fourth conventional technology, since a conventional cover glass for protecting an image sensor can be omitted from the image pickup unit, the thickness of the whole optical plate can be reduced, the spatial efficiency can be improved, and the ray aberration can be reduced. However, in order to be used as a cover glass, the optical LPF needs to be larger than an ordinary optical LPF. In addition, since the optical LPF is close to the image pickup surface, defect control of quartz needs to be stricter. Thus, the cost can be high compared to the case where a conventional cover glass is used.

SUMMARY OF THE INVENTION

At least one exemplary embodiment is directed to an image pickup apparatus that can be disposed in a very small space, reduces the light scattering, the ray aberration, and the cost, and has stable performance.

At least one exemplary embodiment is directed to an image pickup apparatus which includes an image pickup unit, a first optical member, a film, a second optical member, and a luminosity correcting filter. The image pickup unit includes an image sensor. The first optical member is operatively attached to the image pickup unit and can be formed of a birefringent crystal material. The film is disposed between the first optical member and an image pickup optical system (e.g., lens 1) and can be formed of an organic material. The second optical member is operatively attached to a first side of the film. The luminosity correcting filter is operatively attached to a second side of the film.

Further features of the present invention will become apparent from the following description of exemplary embodiments (with reference to the attached drawings).

DESCRIPTION OF THE EMBODIMENTS

Figure 1:
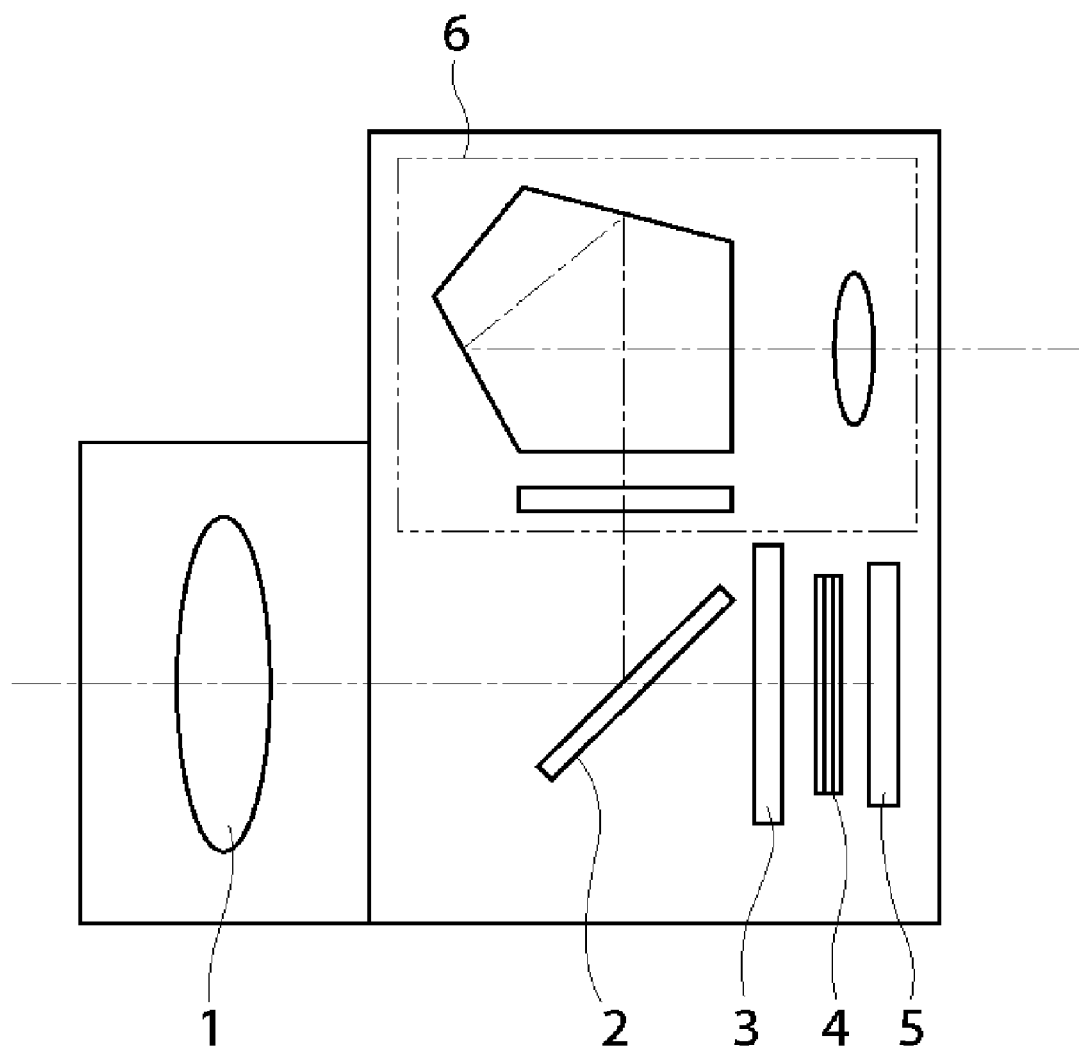
FIG. 1 schematically shows the internal structure of a digital single lens reflex camera as a conventional image pickup apparatus.

The following description of at least one exemplary embodiment is merely illustrative in nature and is in no way intended to limit the invention, its application, or uses.

Processes, techniques, apparatus, and materials as known by one of ordinary skill in the relevant art may not be discussed in detail but are intended to be part of the enabling description where appropriate, for example the fabrication of the lens and filter elements and their materials.

In all of the examples illustrated and discussed herein any specific values should be interpreted to be illustrative only and non limiting. Thus, other examples of the exemplary embodiments could have different values.

Notice that similar reference numerals and letters refer to similar items in the following figures, and thus once an item is defined in one figure, it may not be discussed for following figures.

The exemplary embodiments will now be described with reference to the drawings.

Figure 2:
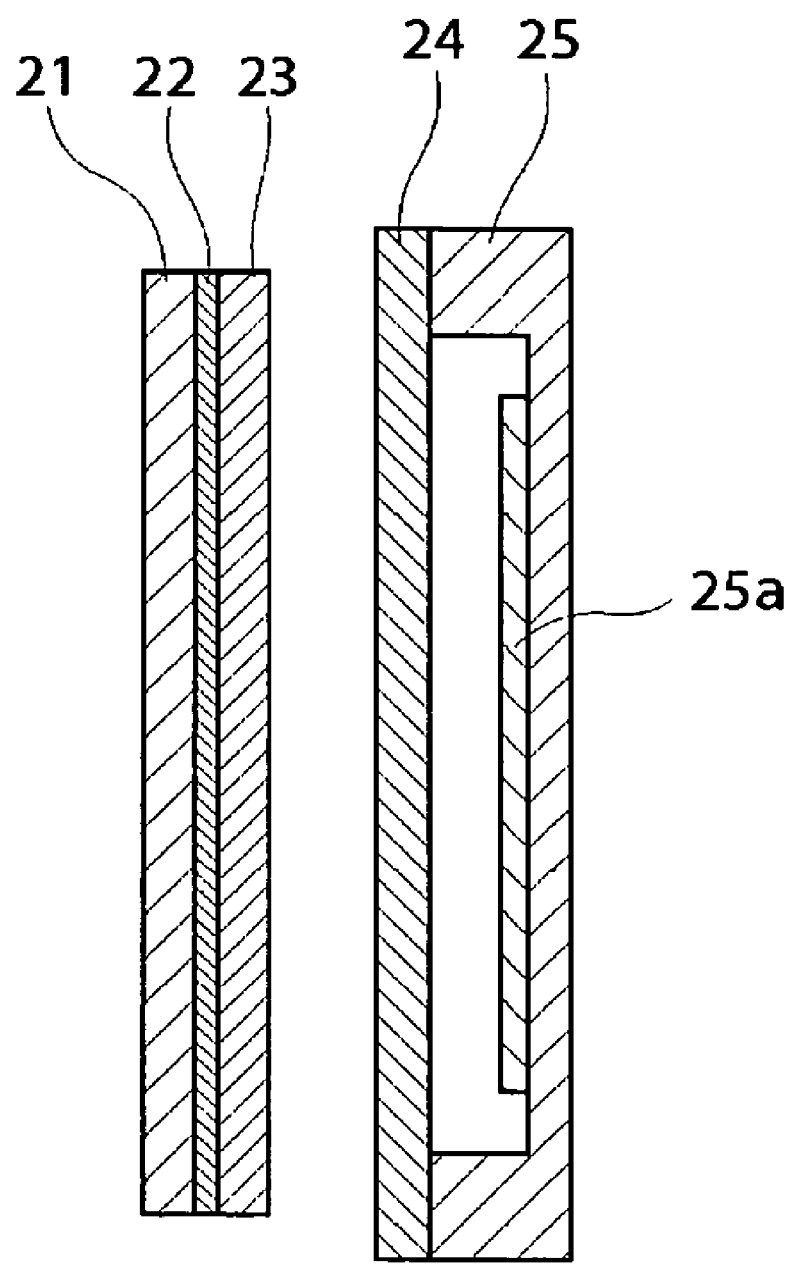
FIG. 2 schematically shows the structure of an optical apparatus according to a first exemplary embodiment of the present invention.

FIG. 2 schematically shows the structure of an optical apparatus according to a first exemplary embodiment of the present invention.

In the present exemplary embodiment, the image pickup unit 5 in the DSLR of FIG. 1 includes an image sensor 25a and a package 25 containing the image sensor 25a.

The optical apparatus (e.g., 21, 22, 23, and 24) of FIG. 2 can be disposed between the image pickup optical system (e.g., lens 1) and the package 25 of the image sensor 25a in the DSLR of FIG. 1.

The optical apparatus of FIG. 2 includes a birefringence plate 24 (e.g., quartz) (first optical member), a birefringence film 22 (film), a phase plate 23 (e.g., quartz) (second optical member), and a luminosity correcting filter 21. The birefringence plate 24 is operatively attached as a cover glass to the package 25 of the image sensor 25a and is birefringent. The birefringence film 22 is disposed between the birefringence plate 24 and the image pickup optical system (e.g., the film) and can be formed of a birefringent organic material. The phase plate 23 is operatively (directly or via intervening layer(s)) attached to one side of the birefringence film 22 facing the birefringence plate 24. The phase plate 23 is a quarter wave plate having phase-difference changing properties. The optical axis of the phase plate 23 can be at an angle of about 45 degrees with respect to the horizontal direction of the image sensor 25a. The luminosity correcting filter 21 is operatively attached to the other side of the birefringence film 22 facing the image pickup optical system.

The luminosity correcting filter 21 blocks or reduces the contribution of rays with unnecessary ranges of wavelength in the incident light. The birefringence film 22 separates the incident light, from which the rays with unnecessary ranges of wavelength have been removed or reduced, into linearly polarized ordinary and extraordinary rays having predetermined planes of vibration, and moves the extraordinary ray in the horizontal direction of the image sensor by a predetermined distance. The phase plate 23 converts the linearly polarized ordinary and extraordinary rays into circularly polarized rays. The birefringence plate 24 separates each of the circularly polarized rays into linearly polarized ordinary and extraordinary rays having predetermined planes of vibration, and moves the extraordinary rays in the vertical direction of the image sensor by a predetermined distance.

According to the present exemplary embodiment, the birefringence plate 24 is operatively attached to the package 25 of the image sensor 25a. The birefringence film 22 is disposed between the birefringence plate 24 and the image pickup optical system. The phase plate 23 is operatively attached to one side of the birefringence film 22 facing the birefringence plate 24, and the luminosity correcting filter 21 is operatively attached to the other side of the birefringence film 22 facing the image pickup optical system. Therefore, the optical apparatus can be disposed in a very small space. In addition, the light scattering, the ray aberration, and the cost can be reduced, and the optical apparatus has stable performance.

Figure 3:
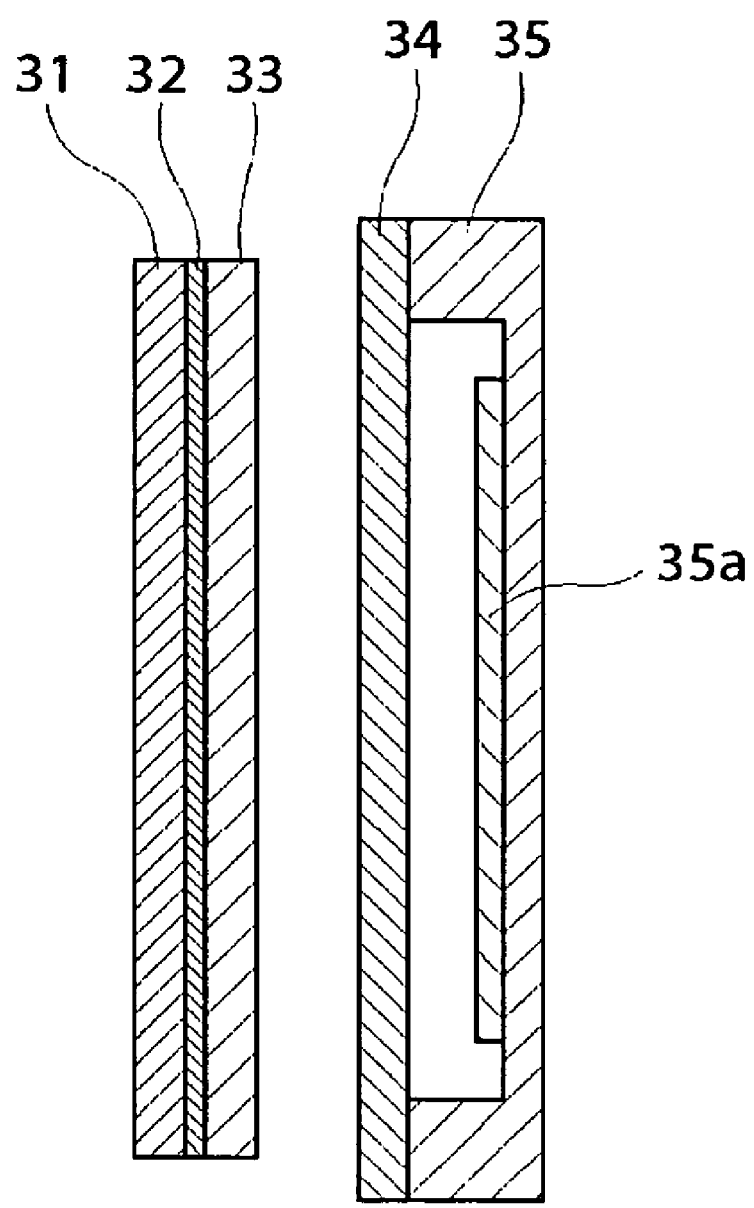
FIG. 3 schematically shows the structure of an optical apparatus according to a second exemplary embodiment of the present invention.

FIG. 3 schematically shows the structure of an optical apparatus according to a second exemplary embodiment of the present invention.

In the present exemplary embodiment, the image pickup unit 5 in the DSLR of FIG. 1 includes an image sensor 35a and a package 35 containing the image sensor 35a.

The optical apparatus (e.g., 31, 32, 33, and 34) of FIG. 3 is disposed between the image pickup optical system (e.g., lens 1) and the package 35 of the image sensor 35a in the DSLR of FIG. 1.

The optical apparatus of FIG. 3 includes a birefringence plate 34 (e.g., quartz) (first optical member), a phase film 32 (film), a luminosity correcting filter 33, and a birefringence plate 31 (e.g., quartz) (second optical member). The birefringence plate 34 is operatively attached as a cover glass to the package 35 of the image sensor 35a and is birefringent. The phase film 32 is disposed between the birefringence plate 34 and the image pickup optical system. The phase film 32 is a quarter wave plate having phase-difference changing properties. The optical axis of the phase film 32 is at an angle of about 45 degrees with respect to the horizontal direction of the image sensor 35a. The phase film 32 can be formed of an organic material or other material as known by one of ordinary skill in the relevant arts that can shift the phase. The luminosity correcting filter 33 is operatively attached to one side of the phase film 32 facing the birefringence plate 34. The birefringence plate 31 is operatively attached to the other side of the phase film 32 facing the image pickup optical system and is birefringent.

The birefringence plate 31 separates the incident light into linearly polarized ordinary and extraordinary rays having predetermined planes of vibration, and moves the extraordinary ray in the horizontal direction of the image sensor by a predetermined distance. The phase film 32 converts the linearly polarized ordinary and extraordinary rays into circularly polarized rays. The luminosity correcting filter 33 blocks or reduces the contribution of rays with unnecessary ranges of wavelength in the circularly polarized rays. The birefringence plate 34 separates each of the circularly polarized rays, from which the rays with unnecessary ranges of wavelength have been removed, into linearly polarized ordinary and extraordinary rays having predetermined planes of vibration, and moves the extraordinary rays in the vertical direction of the image sensor by a predetermined distance.

According to the present exemplary embodiment, the birefringence plate 34 is operatively attached to the package 35 of the image sensor 35a. The phase film 32 is disposed between the birefringence plate 34 and the image pickup optical system. The luminosity correcting filter 33 is operatively attached to one side of the phase film 32 facing the birefringence plate 34, and the birefringence plate 31 is operatively attached to the other side of the phase film 32 facing the image pickup optical system. Therefore, the optical apparatus can be disposed in a very small space. In addition, the light scattering, the ray aberration, and the cost can be reduced, and the optical apparatus has stable performance.

In the above-described first and second exemplary embodiments, due to the configuration of the optical apparatus, incident light can be converted into multiple (e.g., four) output rays that are separated in the horizontal and vertical directions by a predetermined distance(s) and are about equal in intensity, thereby facilitating an optical LPF that can lower a predetermined spatial frequency response.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-139897 filed May 12, 2005, which is hereby incorporated by reference herein in its entirety.

What is claimed is:

1. An image pickup apparatus comprising:
   an image pickup unit including an image sensor;
   a first optical member operatively attached to the image pickup unit and formed of a birefringent crystal material;
   a film disposed between the first optical member and an image pickup optical system and formed of an organic material, the film is birefringent;
   a second optical member operatively attached to a first side of the film, the first side of the film faces the first optical member, the second optical member is formed of a crystal material having phase-difference changing properties; and
   a luminosity correcting filter operatively attached to a second side of the film.

* * * * *